(12) United States Patent
Hertling et al.

(10) Patent No.: US 7,299,244 B2
(45) Date of Patent: Nov. 20, 2007

(54) SYSTEM AND METHOD FOR DYNAMIC SEQUENCING OF A REQUIREMENTS-BASED WORKFLOW

(75) Inventors: William Hertling, Portland, OR (US); Petar Obradovic, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 681 days.

(21) Appl. No.: 10/315,106

(22) Filed: Dec. 10, 2002

(65) Prior Publication Data

US 2004/0111430 A1 Jun. 10, 2004

(51) Int. Cl.
*G06F 17/30* (2006.01)

(52) U.S. Cl. .................. 707/104.1; 707/8; 707/102

(58) Field of Classification Search ............ 707/102, 707/8, 1, 104.11; 705/7, 1, 8; 703/22; 709/220; 719/316
See application file for complete search history.

(56) References Cited

U.S. PATENT DOCUMENTS

| | | | | |
|---|---|---|---|---|
| 6,256,773 | B1* | 7/2001 | Bowman-Amuah | 717/121 |
| 6,502,102 | B1* | 12/2002 | Haswell et al. | 707/102 |
| 6,546,364 | B1* | 4/2003 | Smirnov et al. | 703/22 |
| 6,574,605 | B1* | 6/2003 | Sanders et al. | 705/8 |
| 6,868,441 | B2* | 3/2005 | Greene et al. | 709/220 |
| 6,922,685 | B2* | 7/2005 | Greene et al. | 707/1 |
| 2001/0008997 | A1* | 7/2001 | Masuda et al. | 705/8 |
| 2002/0133503 | A1* | 9/2002 | Amar et al. | 707/104.1 |
| 2002/0173984 | A1* | 11/2002 | Robertson et al. | 705/1 |
| 2002/0184137 | A1* | 12/2002 | Oakeson et al. | 705/37 |
| 2003/0120593 | A1* | 6/2003 | Bansal et al. | 705/39 |
| 2003/0149714 | A1* | 8/2003 | Casati et al. | 709/100 |
| 2004/0015823 | A1* | 1/2004 | Nolan | 717/104 |
| 2004/0059583 | A1* | 3/2004 | O'Neill | 705/1 |

OTHER PUBLICATIONS

Kang, Myong H. et al., "Access Control Mechanisms for Inter-organizational Workflow", SACMAT'o1, May 3-4, 2001, ACM, pp. 66-74.*

* cited by examiner

*Primary Examiner*—Shahid Al Alam

(57) ABSTRACT

A system, and a corresponding method, allow for dynamic sequencing of a requirements-based workflow. The system includes a registry that stores information related to services available to complete a received job request. The system also includes a workflow controller capable of dynamically generating a workflow based on the received job request. The workflow controller includes a rules database containing rules that specify requirements for constructing the workflow based on a nature of the job request. The workflow includes one or more nodes, and the workflow controller dynamically generates the workflow by comparing the requirements of the rules to outputs of prior nodes to generate subsequent nodes. Finally, selected services execute the nodes.

27 Claims, 13 Drawing Sheets

REQUIREMENT: PRINT DOCUMENT

| RULE | PREQ | NODE | INPUT RESOURCES | OUTPUT RESOURCES |
|---|---|---|---|---|
| PREFLIGHT_DOCUMENT | NONE | PREFLIGHT | CONTENT 34 CONTROL DATA 36 | CONTENT 34 CONTROL DATA 36 |
| PSP_QUERY | PRINT_DOCUMENT | INSIDE PAGES COVER | CONTENT 34 CONTROL DATA 36 | PSP LIST |
| PSP_DISPLAY | PSP_QUERY | PSP_DISPLAY | PSP SERVICE $80_i$ | PSP SERVICE $80_i$ |
| ... | | | | |
| RULE N | | | | |

*FIG. 9*

SYSTEM AND METHOD FOR DYNAMIC SEQUENCING OF A REQUIREMENTS-BASED WORKFLOW

TECHNICAL FIELD

The technical field relates to requirement-based workflow execution, and, in particular, to a system and method for dynamically sequencing the requirement-based workflow execution.

BACKGROUND

Current systems that execute a job or workflow may use monolithic application software to control workflow execution. The systems rely on prior knowledge or definition of the workflow by having the workflow definition hard coded in the system. Based on that knowledge, the application software will build the workflow, or the sequence of steps, and then control execution of the workflow. Because of the hard coding, these systems are not adaptive to individual jobs, or to changes in services or processors that may be available at run time to execute the workflow.

One or more operating units in a computer-based network may provide services. Users of the network may generate specific jobs and send the jobs into the network to be assigned to one of the operating units. For example, a user at a computer terminal may generate a printing order using a printer driver installed on the terminal. The printer driver is used to control the printing request. In another example, a user at a computer terminal may generate a printing order, and send the printing order into a computer network so that the printing order is completed by a printing service. The printing order may be related to a company brochure. The printing order may contain unique requirements such as paper type, font size, layout, graphics, color, and other requirements. The user may specify that a specific printing service, such as Kinkos®, prepare the company brochure. Alternatively, the computer network may include programs that suggest printing services to the user.

SUMMARY

In one aspect, what is disclosed is a system for dynamic sequencing of a requirements-based workflow. The system includes a registry that stores information related to services available to complete a received job request. The system also includes a workflow controller capable of dynamically generating a workflow based on the received job request. The workflow controller includes a rules database containing rules that specify requirements for constructing the workflow based on a nature of the job request. The workflow includes one or more nodes, and the workflow controller dynamically generates the workflow by comparing the requirements of the rules to outputs of prior nodes to generate subsequent nodes. Finally, selected services execute the nodes.

In another aspect, what is disclosed is a system to dynamically sequence workflows in a distributed network including means for receiving a job request at a service center in the network, the job request including information related to a job, means for dynamically generating a workflow based on the received job request, means for coupling services to the dynamic generating means, and means for storing information related to the services. The dynamic generating means uses the stored information related to the services and the information related to the job to generate the workflow.

In yet another aspect, what is disclosed is a method for dynamic sequencing of a requirements-based workflow. The method includes the step of receiving a job request that specifies a job to be completed. The method further includes the step of generating a dynamic workflow sequence based on the job. The step of generating the dynamic workflow sequence includes the steps of defining a first node in the workflow sequence, and determining input resources and expected output resources for the first node. The method next includes the step of determining when the first node may execute, and then beginning execution of the first node. Finally, the method includes the step of determining if additional nodes are required to satisfy the job based on actual output resources of the first node.

In still another aspect, a computer may be programmed to execute a method for dynamic sequencing of a requirements-based workflow, the method including the steps of receiving a job request, the job request specifying a job to be completed, generating a dynamic workflow sequence based on the job, determining when the first node may execute, wherein execution of the first node begins, and determining if additional nodes are required to satisfy the job based on actual output resources of the first node. The step of generating the dynamic workflow sequence may include defining a first node in the workflow sequence, and determining input resources and expected output resources for the first node.

In still another aspect, a computer readable medium includes programmed instructions for dynamic sequencing of a requirements-based workflow, the method including the steps of receiving a job request, the job request specifying a job to be completed, generating a dynamic workflow sequence based on the job, determining when the first node may execute, wherein execution of the first node begins, and determining if additional nodes are required to satisfy the job based on actual output resources of the first node. The step of generating the dynamic workflow sequence may include defining a first node in the workflow sequence, and determining input resources and expected output resources for the first node.

DESCRIPTION OF THE DRAWINGS

The detailed description will refer to the following figures in which like numerals refer to like items, and in which:

FIG. 9 is a logical diagram of a rules-based database used with the workflow controller of FIG. 8.

DETAILED DESCRIPTION

Figure 1:
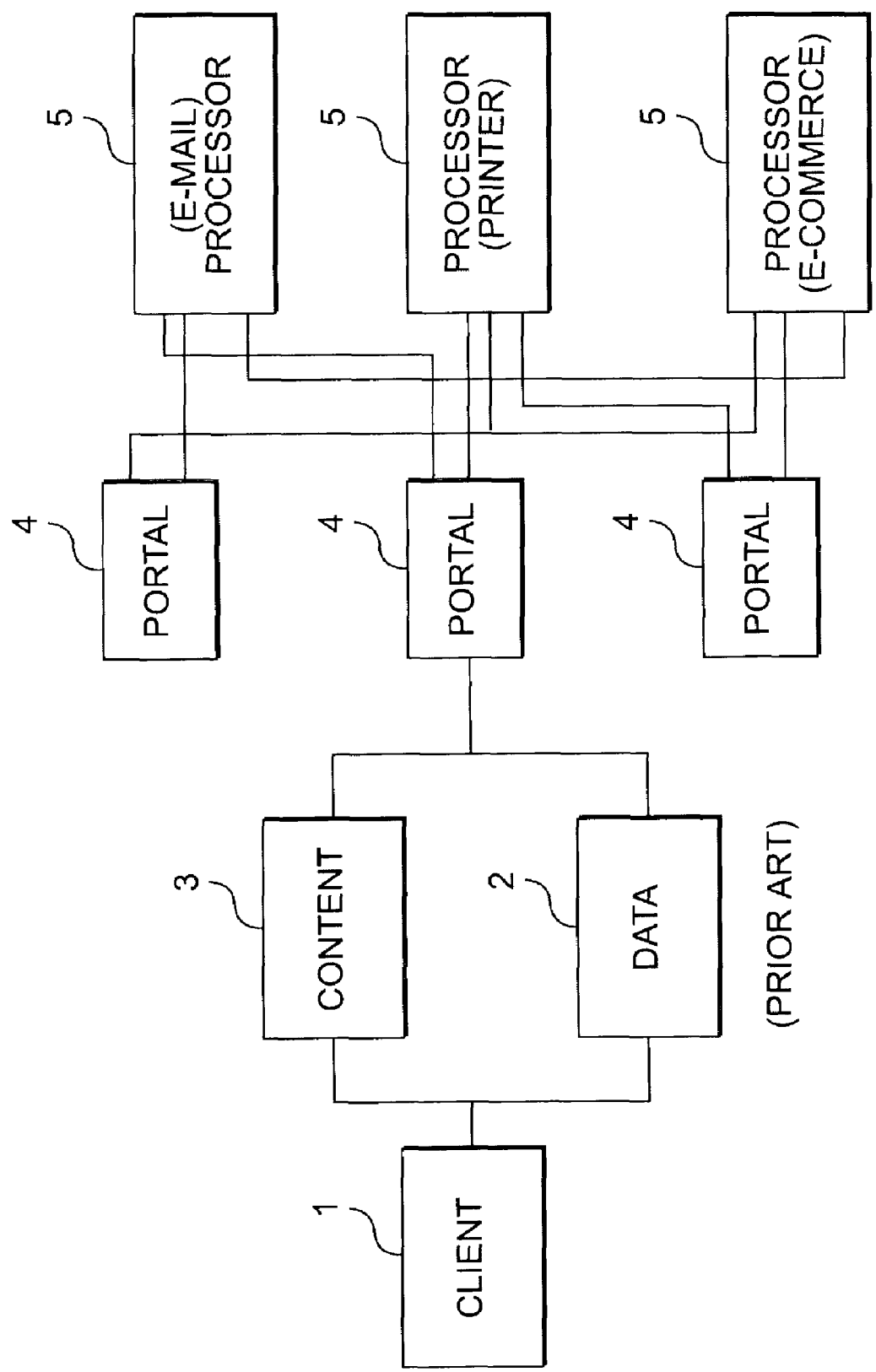
FIG. 1 illustrates a prior art solution for workflow execution.

FIG. 1 illustrates an existing approach for workflow execution in which a required task, or job, is controlled using a specific application software. Such an application is often associated with a printing standard, an example of which is a job definition format (JDF). The JDF is described in detail in JDF Specification Draft Spiral 4.0, available at http://www.cip.org, which is hereby incorporated by reference. In FIG. 1, a user/client 1 generates a job request and sends the job request through a portal 4 to a processor 5. The job request may include a job data file 2 and a content file 3. The user 1 may be a computer terminal in a networked computer system and the processor 5 may be a networked printer. The job request may involve printing a document. The document may be represented by the content 3, which is a digital representation of text and images to be printed. The intended format of the printed document may be described in the job data file 2, which is simply a digital file that specifies how the printer is to print the document. For example, the job data file 2 may require that the document be printed on back-to-back pages.

In a specific application, a printer driver may carry out the functions of the job data file 2. The printer driver encodes control data related to printing the document, and sends the control data and the content 3 to the printer (i.e., the processor 5). The printer accesses the control data and the content 3 to print the document.

While the application shown in FIG. 1 works well to print a document, the application has many drawbacks. In particular, if multiple processors are involved in producing the document, each such processor will require access to the job data file 2. This access brings problems related to security, modification control, and workflow control. For example, a processor requiring access to the job data file 2 may have to wait on processing until a prior processor has completed use of the job data file 2. Thus, the prior art application may result in unwanted delays in completing the job request.

Prior art applications of workflow execution services, such as that shown in FIG. 1, also suffer because the user may not know anything about the processors, including capabilities and availabilities of the processors, or even if the processors exist. Thus, the user may not know which portal to use to connect to a specific processor.

The system illustrated in FIG. 1 also suffers because the application software used to control the workflow is monolithic. That is, the application software has previous knowledge of the workflow since the workflow definition is hard coded into the application software and is not adaptive to individual jobs. Based on that knowledge, the application software will build the workflow, or sequence of steps, and will then execute the workflow to completion. However, the application software cannot dynamically account for changes in a desired workflow, and cannot account for changes in services or processors that become available for use in execution of the workflow.

These and other problems are solved by a method and a system that dynamically controls workflow execution. The system includes mechanisms that arbitrate access to the workflow among multiple services or processors, limit access to the workflow by incorporating security features, and ensure modifications made by one service, processor or user are reflected in the workflow. In an embodiment, the system includes a central database, or registry, that couples input data from clients as job requests with output capabilities of services that perform tasks or processes to complete the job requests. The registry may have the features of a generic XML database, in that the registry is extensible, and in that the clients need not have any knowledge of the individual processes to be performed or the internal programming requirements of the services. Thus, the clients may submit job requests to a service center that will ensure that an appropriate service or services are assigned to complete the job request.

Figure 2:
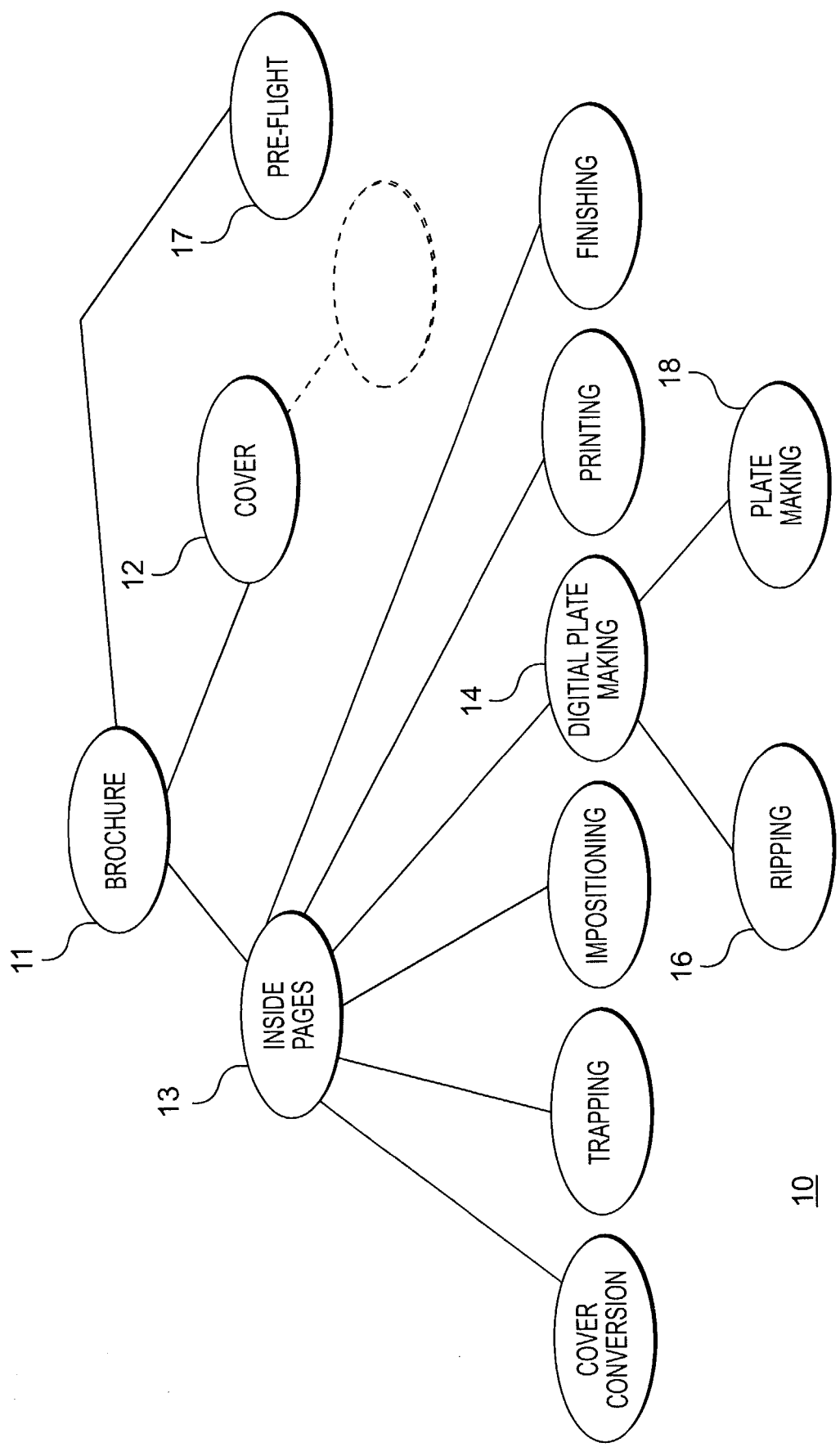
FIG. 2 illustrates a node tree that may be used to define individual requirements in a workflow according to an embodiment.

The apparatus and method may follow any number of workflows, an example of which is shown in FIG. 2 as a node-tree diagram (or simply a node tree) 10 that illustrates processes defined in a workflow for printing a brochure. The nodes may specify recursive conditions. In addition, the nodes may be mandatory or optional, and whether a specific node is mandatory or optional may change during execution of a specific workflow. The brochure may be printed on a commercial press, and may use digital content to generate plates for printing the brochure. Within the node tree 10, the nodes specify a product, process, or group of processes. Each node may modify, consume or create resources. Each node may contain further nested nodes, or sub-nodes. The arrangement of nodes and sub-nodes may be likened to a tree, and each node and sub-node may be referred to as a branch. A brochure node 11 defines the features and parameters of the brochure. A preflight node 17 may be used to obtain the brochure requirements, such as orientation, pay layout, font, color, and other document-specific features. A cover node 12 defines the parameters for producing the brochure cover. Inside pages node 13 includes the parameters to produce the inside pages. The inside pages node 13 is shown with several sub-nodes, including a digital plate making sub-node 14. The digital plate making sub-node 14 itself includes two additional sub-nodes, a ripping sub-node 16 and a plate making sub-node 18.

Each of the nodes and sub-nodes shown in FIG. 2 has associated with it input resources and at least one output resource. A resource may be described by parameters or logical entities. The resource may be a physical entity such as a component, a handling resource, or a consumable. A component resource may be the output of a node or sub-node, such as printed sheets. A handling resource is used during a process, but is not consumed by the process. A handling resource may include a mechanism for transporting a component resource from one stage of production to another. The process may partly or wholly consume a consumable resource. Examples of consumable resources include inks, plates, and glue. Other resources may be a digital file or representation of a physical object. For example, the ripping sub-node 16 may include as input resources a run list, media, RIP parameters, and layout. The run list resource describes the pages, including the files in which the pages occur, and which pages are to be used. The media resource describes the media that will be used to make plates, and is needed to describe the dimensions of the media. The RIP parameters resource describes all device-specific parameters of the ripping process. The layout resource describes placement of source pages onto the plates, and eventually onto press sheets. As an output resource, the ripping sub-node 16 may provide ripped flats. Other resources include parameter resources, which define the details of processes, as well as other non-physical computer files used by a process.

The node tree 10 shown in FIG. 2 is intended to apply to printing a document. However, node-tree diagrams may be used to represent workflows for other services besides printing. For example, a workflow may be used for data processing, image processing, creating and maintaining a database, electronic publishing, e-mail, and various e-commerce services. Moreover, a workflow may be used to define how different e-commerce services interact with each other.

Figure 3:
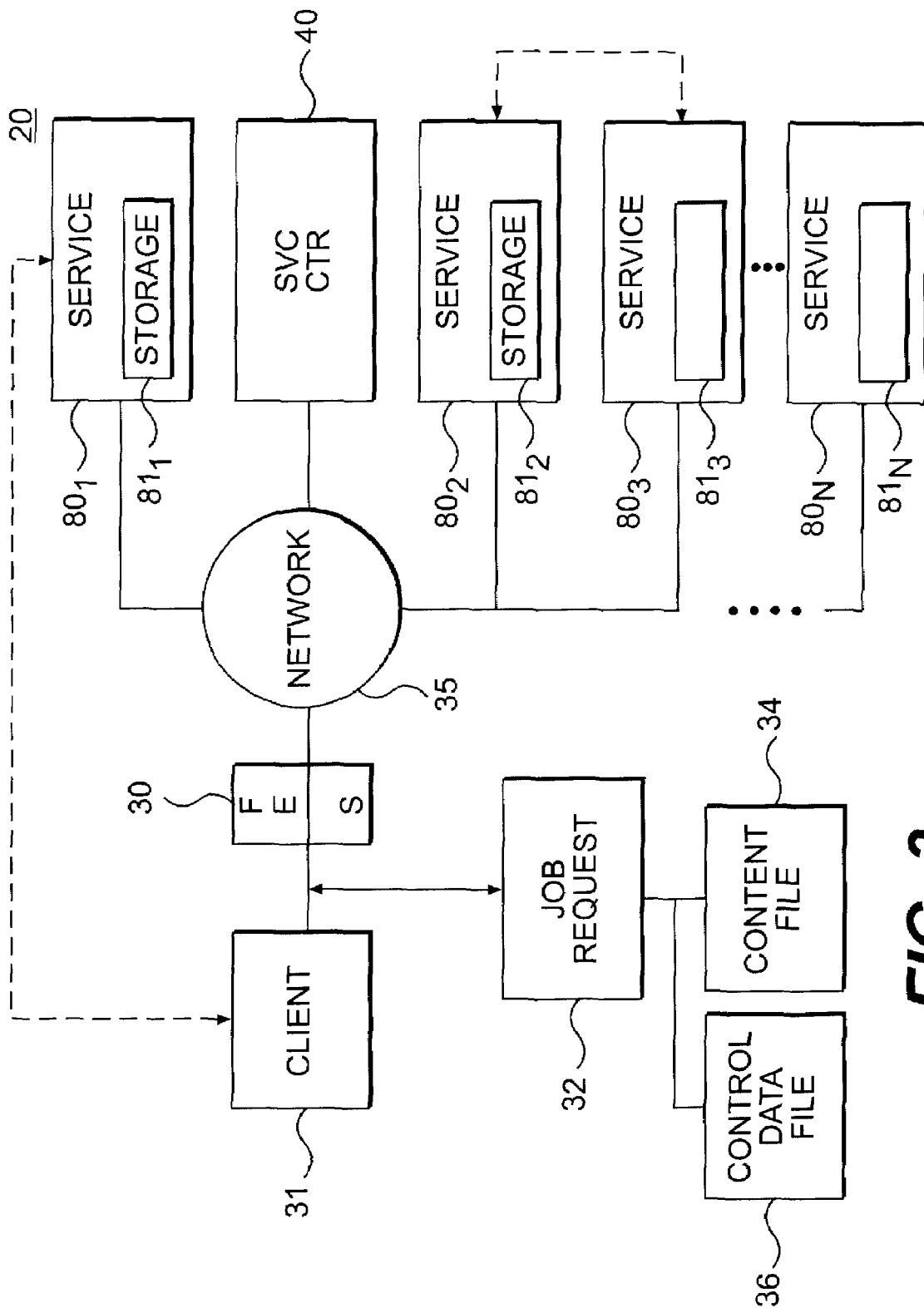
FIG. 3 illustrates a block diagram of a system for dynamically generating a requirements based workflow, such as the workflow illustrated in FIG. 2 according to an embodiment.

FIG. 3 is a block diagram of a dynamic workflow execution system 20 that incorporates a service center 40 to control job requests submitted by a client 31. The service center 40 may operate as a single portal through which the client 31 connects to one or more e-services including e-mail, e-commerce and online shopping, e-printing, and data services, including database searching and database construction, population and maintenance. Using a single portal, such as the service center 40, allows the client 31 to receive a wide variety of e-services, such as those noted above, without requiring the client 31 to have any prior knowledge of the e-services.

The service center 40 may include components that receive information in the form of job requests, and using the information, dynamically generate a workflow definition that specifies tasks and resources. The workflow definition may be temporarily stored in at the service center 40, and the workflow definition, or, alternatively, related notices, may be posted to indicate when a workflow definition is available. The service center 40 may select candidate services to complete the job request. Alternatively, services coupled to the service center 40 may bid on completion of the job defined by the workflow, and the service center 40 may include a bidding service that evaluates bids. The service center 40 may select one or more services to assign to execution of the workflow based on client-supplied criteria, or based on a set of standard criteria, including industry standard criteria. The service center 40 may provide mechanisms to control access to the job, or to portions (tasks, sub-tasks, or branches) of the job. The mechanisms include branch locking, and authorization and authentication servers that use public key encryption, or similar processes.

The service center 40 may include hardware components such as servers, computers, central processing units, communications interfaces, and memory devices to provide the processing capability and data storage required to carry out the above-described functions.

The system 20 includes a front-end service (FES) 30 that allows the client 31 to generate and submit a service or job request 32. In an embodiment, the front end service may be an Internet web browser. Alternatively, the front end service 30 may be a web application or a port monitor. The job request 32 may contain detailed information about how the job is to be executed, and may be formatted according to the job definition format standard. Alternatively, the job request 32 may include only basic information, which will be used by another component to finalize the job definition, or work flow. In an embodiment, the job request 32 includes a content file 34, which is the data that is to be processed. The content file 34 could be one or more digital files, text files, and other files. For example, the content file 34 could comprise the text and graphics to be printed in a brochure. The job request may also include a control data file 36 that specifies the requirements for processing the content file 34, and that may provide other information including an identification of the client 31, for example.

The front end service 30 is coupled to a communications network 35, which may be the Internet, a wide area network, or a local area network, for example. Coupled to the communications network 35 is a service center 40 that links one or more services $80_1$ to the communications network 35. Each of the services $80_1$ may include a database $81_1$ that may be used to store information related to the job request 32, including information related to standard workflow definitions or steps. In an embodiment, the service center 40 may be an Internet web site that includes data storage and control functions. In another embodiment, the service center 40 is a node in a local area network.

The service center 40 allows a broad spectrum of communications between entities coupled to the service center 40. In particular, the service center 40 allows different e-services to interact programmatically with one another using specific protocols and generic protocols (e.g., TCP/IP). This programmatic interaction allows different services and processes that are coupled to the network to exchange data and files, and to modify the data and files. The programmatic interaction may be completed by use of a remote procedure call (RPC) between entities coupled to the service center 40. Other methods for providing the programmatic interaction include CORBA, UDDI, SOAP, xml over http, and e-speak.

Figure 4:
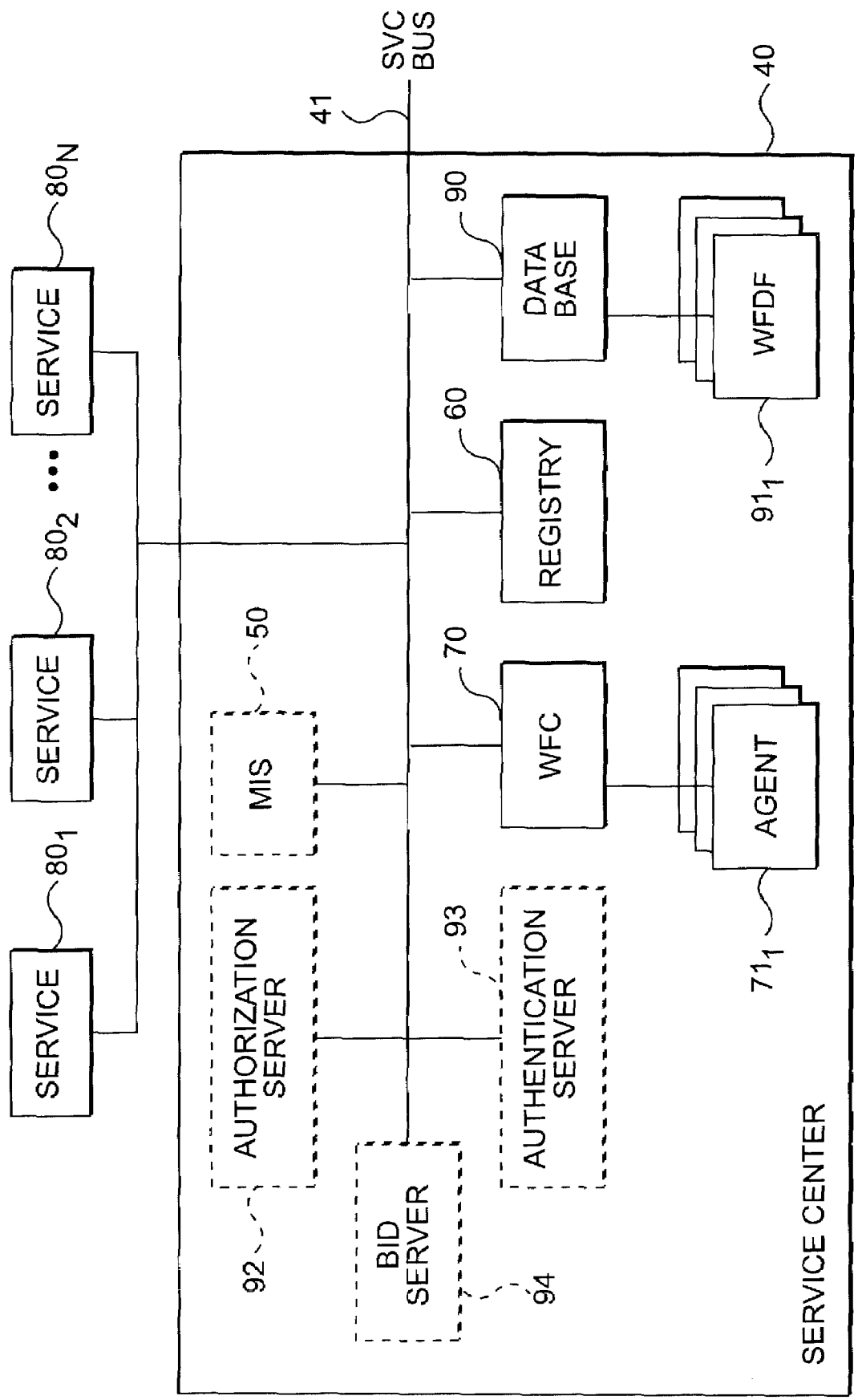
FIG. 4 is a block diagram of components of the system shown in FIG. 3.

Referring to FIG. 4, the service center 40 may include a suitably programmed processor such as a workflow controller (WFC) 70. Among its many possible operations, the workflow controller 70 may designate the various nodes, input and output resources, and other features of the node tree used to complete the job request. That is, the workflow controller 70 may be used to dynamically create a construct, or workflow definition, such as the node tree 10 shown in FIG. 2. To accomplish these tasks, the workflow controller 70 may include one or more agents $71_1$ that write a job definition file, based on control data contained in the job request 32. Optionally, a separate management information system (MIS) 50 may be used to create the nodes, and to control flow of tasks to the services $80_1$ and other entities. In yet another embodiment, the client 31 which originated the job request 32 may write the job definitions.

The service center 40 also includes a service bus 41 in communication with the communications network 35 (see FIG. 3) and the services $80_1$. Coupled to the service bus 41 are a central registry 60, a database 90, and optional bidding server 94, authorization server 92 and authentication server 93. The optional devices will be described later. The database 90 may store one or more specific workflow definition files $91_1$. The service center 40 may control one or more of the workflow definition files $91_1$. The workflow definition files $91_1$ may specify the various tasks and sub-tasks needed to implement a workflow, such as the node tree 10 shown in FIG. 2, in order to complete the job request. The workflow controller 70 may use one or more agents $71_i$ to control processes on the service bus 41.

Referring again to the node tree 10 of FIG. 2, many output resources of the individual nodes serve as input resources for other nodes. These other nodes may not be able to begin executing until some or all input resources are complete and available, which means that the nodes may need to execute according to a set of rules such that some tasks and sub-tasks in the job request are executed in a well-defined, but not necessarily pre-defined sequence. For example, a process for making plates will produce press plates as an output resource that is required by a printing process. A process for printing a brochure may require use of the plates. However, the brochures may be printed by sending brochure data to a networked printer (i.e., a service 80), which then produces the initial output resource of printed pages for the brochure. In the hierarchical organization of the node tree 10, nodes that occur higher in the node tree 10 represent higher-level, more abstract operations, while lower order nodes represent more detailed, specific processes. Moreover, nodes near the top of the node tree 10 may represent only intent regarding the components or assemblies that comprise the product, and lower level nodes provided the detailed instructions to a service 80 to perform a specific process.

Because two node trees may not be similar, the workflow controller 70 may determine processes to be completed, the order in which the processes are completed, and the services $80_1$ that are to complete the processes. The workflow controller 70 may use the agents $71_1$ to determine an actual workflow, considering factors such as control abilities of the services that complete the processes, transport distances between services, load capabilities of the services, and time constrains in the job request, for example. The agents $71_1$ may define the overall process using serial processing, which involves subsequent production and consumption of resources by the services $80_1$, overlapping processing, which involves simultaneous consumption and production of resources by more than one service 80, parallel processing, which involves sharing resources among services $80_1$, and iterative processing, which involves a back and forth processing scheme to develop resources.

In determining which of the services $80_i$ to assign to complete a particular job request, the workflow controller 70 may poll services $80_1$ that are coupled to the service center 40. As noted above, the services $80_i$ may be coupled directly to the service bus 41, or may be coupled indirectly through another communications bus, such as the Internet, for example. The polling may occur whenever a workflow definition files $91_1$ is created at the service center 40. Alternatively, the polling and corresponding information collection may occur on a periodic basis, and the workflow controller 70 may store information related to the services $80_i$.

As an alternative to polling, services $80_1$ coupled to the service center 40 may monitor execution of the workflow definition files $91_1$. The service center 40 may periodically post, in a bulletin board fashion, for example, notices for workflow definition files $91_1$ that are available for processing. The services $80_1$ may then submit a bid for the tasks and processes defined in the notice. The workflow controller 70, or the separate, optional bidding server 94, may review the bids, and determine which single service $80_i$ or combination of services $80_1$ would be best suited to complete the tasks and processes defined in the job notice.

Figure 5:
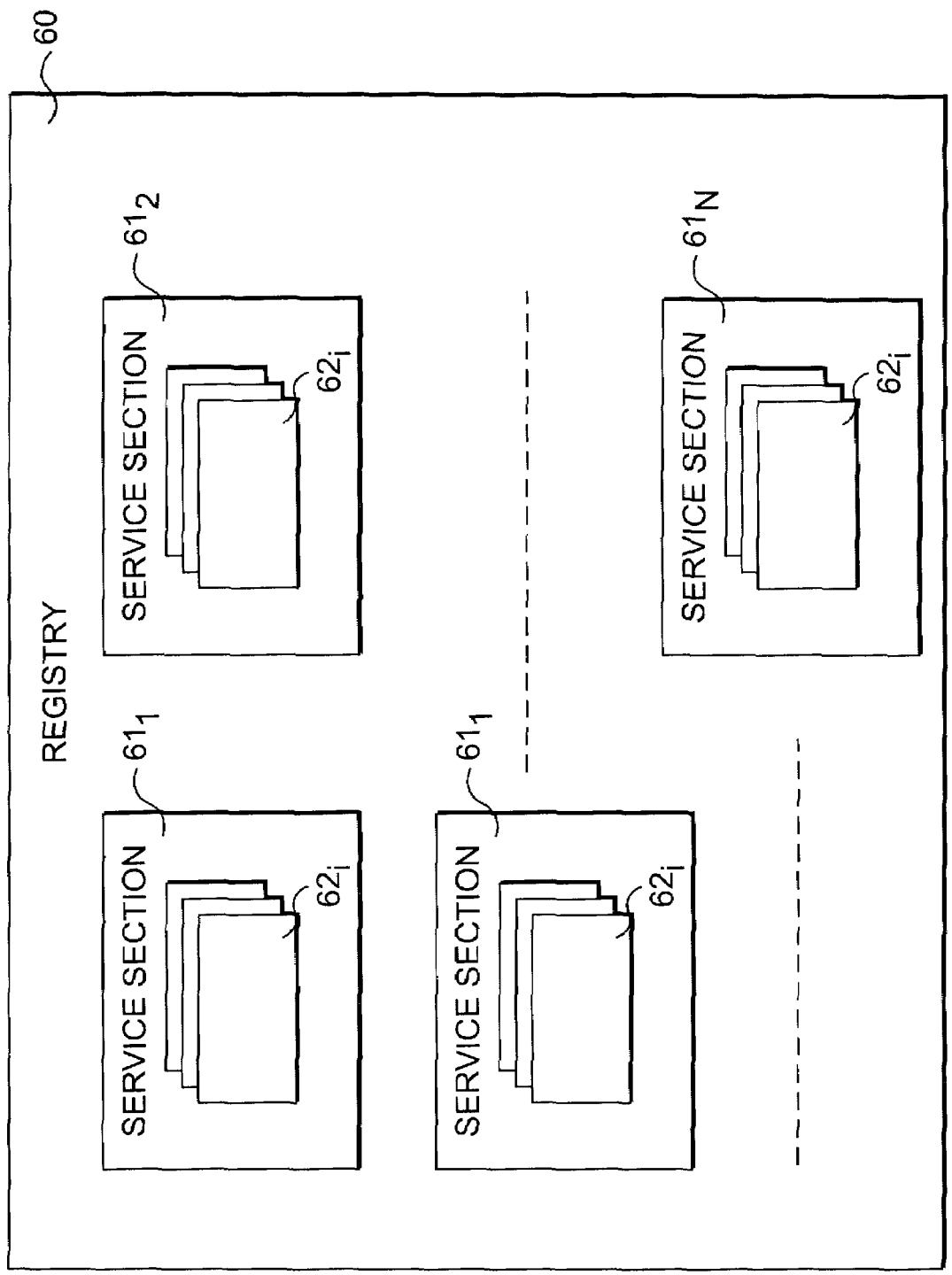
FIG. 5 is a logical diagram of a registry used with the system of FIG. 3.

In determining which of the services $80_1$ to assign to a specific task or sub-task, the workflow controller 70 may consult the central registry 60. FIG. 5 shows an embodiment of the registry 60. The registry 60 may be a data storage device or medium accessible by the services $80_1$. The services $80_i$ may register service information with the registry 60 according to a pre-defined format. The workflow controller 70 may then access the service information to assign services to the tasks and sub-tasks that define a particular workflow. When assigning a service $80_1$ to a task or sub-task, the workflow controller 70 may take into account conditions existing at the completion of a prior task or sub-task. For example, a sub-task of printing a brochure may complete twelve hours later then originally scheduled, such that certain services that ordinarily would complete the next sub-task (for example, binding) may not be available, while new binding services may have registered with the registry 60. Thus, the workflow controller 70 is able to dynamically allocate services based on the actual execution of a workflow.

As FIG. 5 shows, the registry 60 may include a number of sections $61_1$ that store service information according to a pre-defined format as discrete files $62_i$. The sections $61_1$ may comprise files $62_1$ for the services $80_1$ of a common type. For example, a print service section $61_i$ may include files $62_i$ for Kinkos® and other commercial print services, networked printers, and other print services. The information included in the files $62_1$ may be provided by the individual services $80_i$. The information included in the files may identify the service $80_1$ and may provide the capability and availability of the service $80_i$, and other information, including price information, for example.

The service center 40 (see FIG. 4) may include several features to provide security and to control access to the workflow definition files $91_1$. As discussed above, the service center 40 may include a provision for branch locking. In addition, servers may be used to authorize and authenticate a service 80 and maintain the authorization and authentication during completion of a job request 32. The authentication server 93 receives authentication information from a service 80 and the authorization server 92 uses the information to check authorization functionality. The authorization or access rights of the service 80 may be carried as a part of the workflow definition files $91_i$. The servers 92 and 93 may be hardware devices, but need not exist in the same hardware platform, and the servers 92 and 93 need not be tightly coupled. Alternatively, the functions of the servers 92 and 93 may be performed in programming stored in one of the components of the service center 40, such as the workflow controller 70, for example. Using the above-described features, the service center 40 may provide trusted authentication information about the service 80 to the authorization server 92, and the authorization server 92 then performs its authority check functions.

The workflow definition files $91_i$ generated by the workflow controller 70 may include specific tasks or sub-tasks (branches) that must be completed to complete the job request 32 (see FIG. 3). A simple job request 32 may have only one branch. More complex job requests 32, such as the job request illustrated in FIG. 2 (i.e., print a brochure) may have many branches. Furthermore, some branches may be so interrelated that they can only be completed in a specific sequence, while other branches can be completed in a parallel or an overlapping fashion. These interrelationships may often be the result of one branch producing an output resource that is an input resource for one or more other branches. Furthermore, as new services $80_1$ register with the registry 60, the interrelationships between branches may change.

The workflow definition file $91_1$ may include descriptions of specific branches and their interrelationships. This information may be shown in sufficient detail to allow the services $80_1$ to bid for completion of the branches. The workflow definition files $91_i$ may persist in the service center 40 for a specified time to allow the services $80_1$ to send bids. The time may be a set value (e.g., one hour) or may be based on a completion deadline specified in the job request 32.

In an embodiment, the workflow controller 70 selects winning services $80_1$ based on a set of criteria. Alternatively, the optional bidding server 94 may select bids from the services $80_1$ based on set criteria. For example, the job request 32 may specify minimum performance requirements (e.g., a maximum cost and a completion deadline). The bidding server 94 may reject any bids that fail to satisfy the minimum performance requirements. Where the workflow controller 70 has established multiple branches, each such branch may include minimum performance requirements. The branch-specific performance requirements may be established by the workflow controller 70 based on overall performance requirements in the workflow definition file $91_1$. The bidding server 94 may reject a service 80 that bids on a particular branch if the service 80 fails to meet the minimum performance requirements.

If the client 31 does not specify any minimum performance requirements, the workflow controller 70, and alternatively the bidding server 94, may apply a standard set of criteria (e.g., an industry standard). For bids, the bid must satisfy any requirements for producing output resources. In this way, bids that are made in error, or that would otherwise likely be rejected, can be screened out. For example, a bid for printing inside pages of the brochure may indicate a one-year completion date. Such a bid may be rejected, even in the absence of any specified performance requirements from the client 31.

In addition to submitting performance requirements, the client 31 may specify an evaluation algorithm for evaluating bids and services $80_1$. For example, the client 31 may specify that cost is to be weighted twice as much as any other performance requirement.

In the absence of a client-specified evaluation algorithm, workflow controller 70, or, optionally, the bidding service 91, may apply a standard evaluation algorithm in order to rank services $80_i$ for each branch in the workflow definition file $91_1$. The evaluation algorithm may apply weighting criteria, or may apply a default rule. For example, services $80_1$ may be ranked based on a maximum score, where points are awarded for cost estimates below a maximum and for completion times below a maximum. Once the evaluation algorithm has been applied, the workflow controller 70 ranks the services $80_i$ (or, the bidding service 91 ranks the bids) for each branch. If only one service 80 survives the process, that service 80 may be automatically selected and assigned to the branch. If multiple services $80_1$ survive, the workflow controller 70 may apply additional selection criteria, such as a round-robin selection scheme, to assign services $80_1$ to branches. Alternatively, the list may be provided to the client 31, and the client 31 may select the service(s) $80_1$ to complete the tasks defined in the workflow definition file $91_1$.

The workflow controller 70 may associate winning services $80_1$ with corresponding branches of the workflow definition file $91_1$, and may store the service selection information with the workflow definition file $91_1$. The stored selection information may include identification information that allows the authorization server 92 and the authentication server 93 to permit access to workflow definition file $91_1$ branches or to the entire workflow definition file $91_1$. Because the selection information is stored with the workflow definition file $91_i$, a service 80 may access those branches for which the service 80 is authorized access without having to communicate directly with the service center 40. This feature allows the workflow definition file $91_1$ to be passed from one service 80 to another service 80, which improves processing time and efficiency.

In an embodiment, the service center 40 may comprise a sequence of programming instructions that are recorded on a machine-readable medium, such as a CD-ROM, for example. A computer may read the programming instructions and execute processes to provide the functions of the service center 40, including using a workflow definition file to store bid information.

Figure 6:
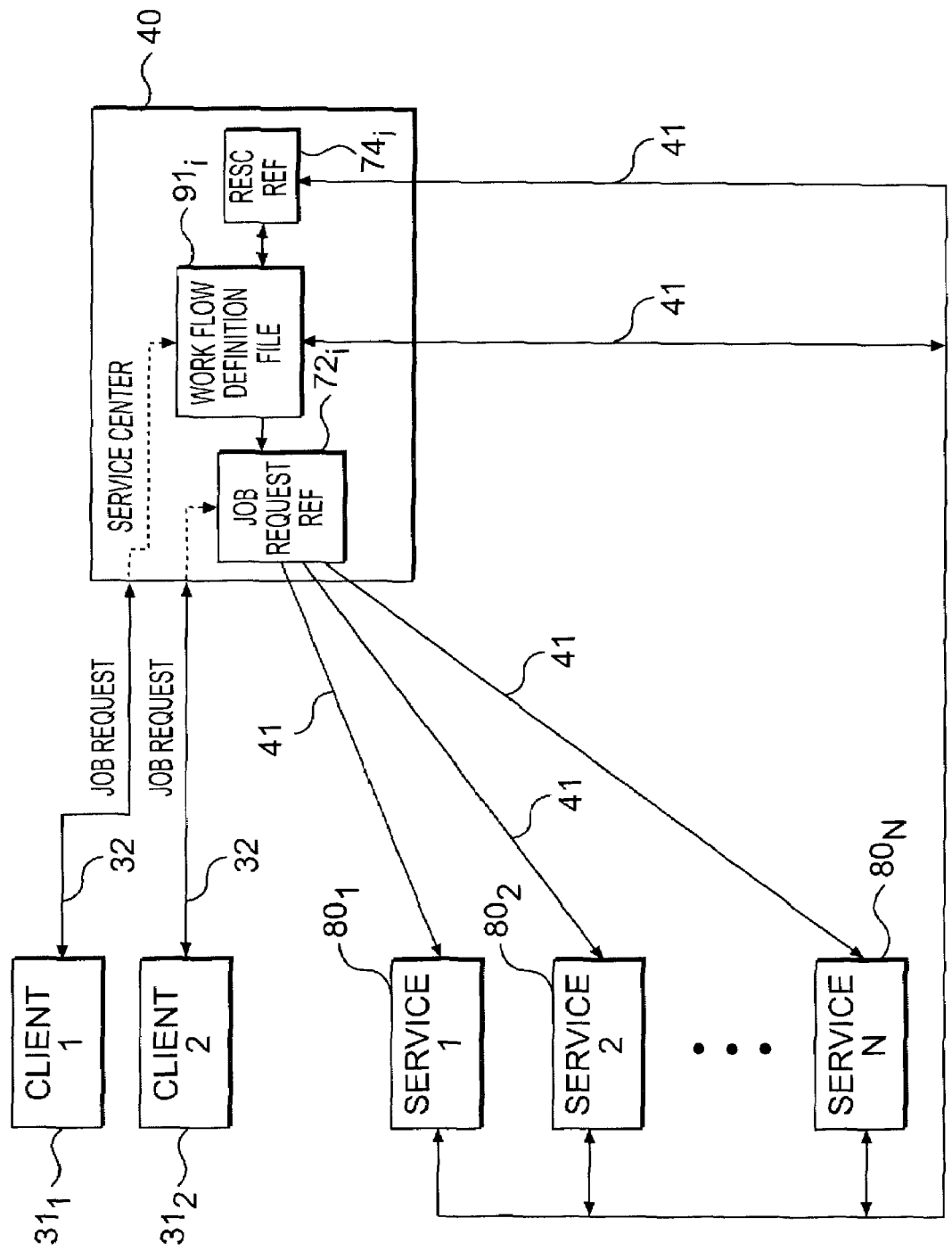
FIG. 6 is a diagram illustrating selected functions of the system of FIG. 3.

FIG. 6 is a diagram showing operation of selected functions of the service center 40. As shown in FIG. 6, the service center 40 includes workflow definition files $91_1$, which may be programming objects such as that represented by the node tree 10 shown in FIG. 2, and described above. The client $31_1$ may supply the job request 32 to the service center 40. Using the job request 32, the service center 40 creates the workflow definition files $91_1$, and makes the workflow definition files $91_1$ available to one or more of the services $80_i$. The service center 40 may also supply the workflow definition files $91_i$ to the client $31_1$. The client $31_1$ may be a networked computer or similar device that is capable of transmitting the digital information representing the job request 32 to the service center 40.

Also shown in FIG. 6 are client $31_2$ and services $80_1$-$80_N$. The services $80_1$-$80_N$ may include networked resources such as networked printers, electronic-commerce entities, such as Internet web sites, and "brick and mortar" entities, such local print shops that are coupled to the service center 40 using the service bus 41.

The workflow definition file $91_1$ specifies tasks and sub-tasks that must be completed to finish the job request 32. As noted above, FIG. 2 illustrates processes required to print a brochure, including the inside pages and the cover. More that one service $80_1$ may be required to complete such a job request 32, or to complete the job request 32 in the most cost-efficient and/or timely manner. The workflow controller 70 (see FIG. 4) can determine which of the services $80_1$-$80_N$ should complete a specific process, and, if necessary, the order in which such processes should be completed. The workflow controller 70 may poll the various services $80_1$ to determine which may be used to complete the job request.

For each job request 32 received, the workflow controller 70 may create a reference $72_1$ to the job request 32. The service $80_1$ may request access to the associated workflow definition file $91_1$ in order to complete one or more tasks or sub-tasks. In response, the workflow controller 70 provides the service $80_i$ with the job request reference $72_1$. The job request reference $72_1$ is then used as an index to the job request 32. The job request reference $72_1$ may also be provided to other services, such as the service $80_2$, and to other clients, such as the client $31_2$. The service $80_2$ and the client $31_2$ may then access the workflow definition file $91_i$ at the same time as the service $80_1$ accesses the workflow definition file $91_i$. This simultaneous access allows different tasks and sub-tasks to be completed in parallel. In the example illustrated in FIG. 2, the service $80_1$ may complete some or all the tasks for the inside pages, and the service $80_2$ may complete the tasks for the cover.

Figure 7:
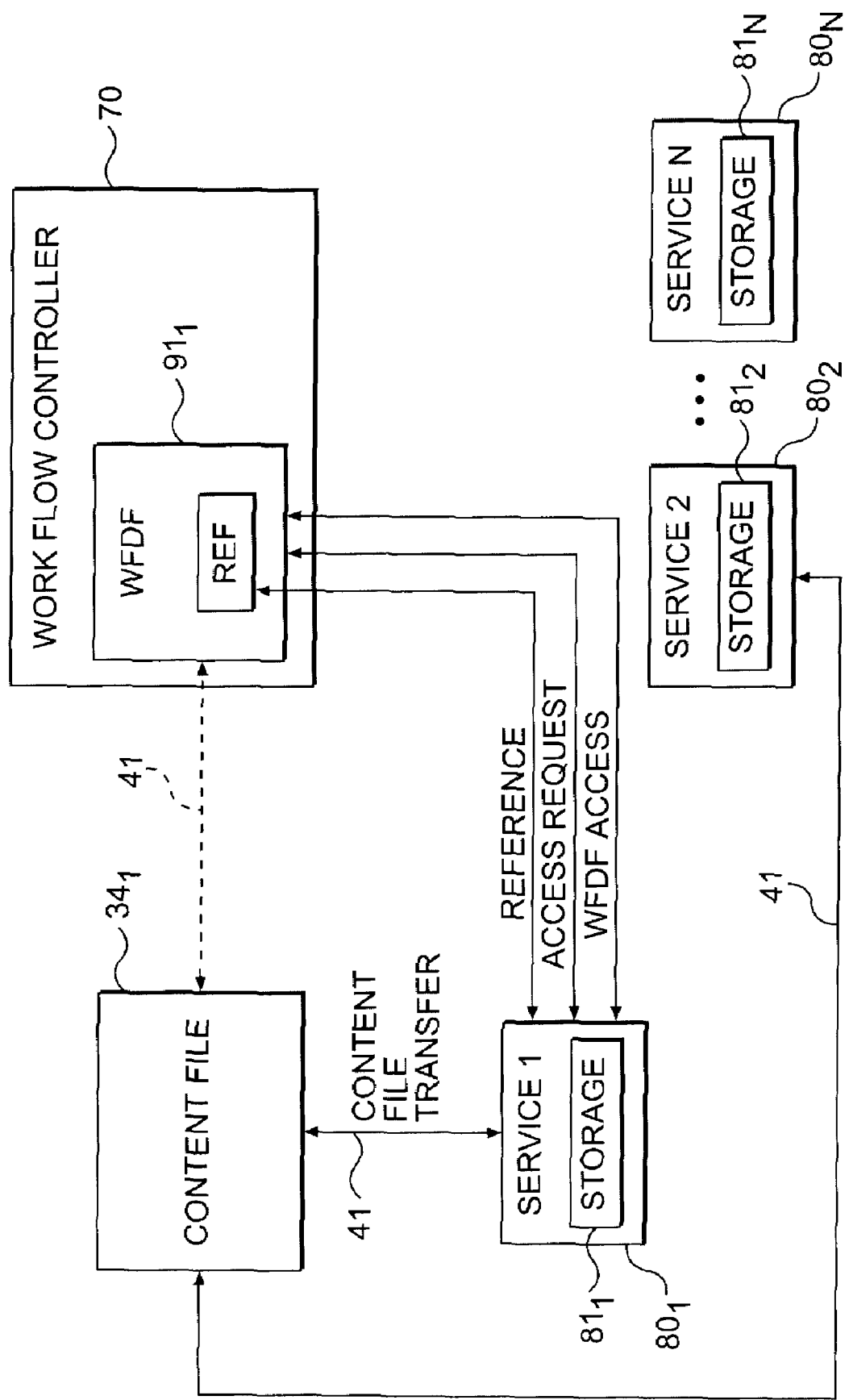
FIG. 7 is a block diagram illustrating control features of the components of FIG. 4.

FIG. 7 is a block diagram illustrating an example application of the control features of the service center 40. The workflow definition file (WFDF) $91_1$ is referenced to the content file 34 of the job request 32, and information related to the workflow definition file $91_i$ and the content file 34 is passed over the service bus 41. The services $80_1$ can access the content file 34 and the workflow definition file $91_i$ using the service bus 41. In the illustrated example, the workflow definition file $91_1$ refers to a job request 32 to print a brochure using the processes outlined in FIG. 2. The service $80_1$ is designated by the workflow controller 70 to produce the inside pages of the brochure and the service $80_2$ is designated to produce the brochure cover. The service $80_1$ passes an access request to the service center 40. The access request may include security information that allows the service $80_1$ to access the workflow definition file $91_1$ and the corresponding content 34$_1$ or job. In response, the service center 40 provides a job request reference (REF) $72_1$ that is used by the service $80_1$ to access workflow definition file $91_1$. The service $80_1$ may use information in the workflow definition file $91_1$ to access the content file $34_1$. Since the service $80_1$ will produce only the inside pages, the service $80_1$ will not need access to all the information contained in the workflow definition file $91_i$. Furthermore, because the workflow definition file $91_1$ remains in the service center 40, other entities, such as the service $80_2$, may continue to access the workflow definition file $91_i$.

As the service $80_1$ completes various tasks, the service $80_1$ may update the content file 34 and the workflow definition file $91_1$. Thus, the workflow definition file $91_1$ may reflect the latest status of the job request 32. The status reports may indicate when a node in the node tree 10 is completed, when an interim deadline is completed, when another service may be used to complete a task, and when all tasks are complete. The status report may be included in a digital file that is used by the workflow controller 70, for example. The status report may also be included in a human-readable format, such as a pop-up window on a computer display screen. The service $80_1$ may receive the job request reference $72_1$, and may complete all scheduled tasks, returning the job request reference $72_1$ to the service center 40. The service $80_1$ may also send a copy of the job request reference $72_1$ to the service $80_2$, so that the service $80_2$ may access the workflow definition file $91_i$, and the content file 34 and produce the brochure cover.

Figure 8:
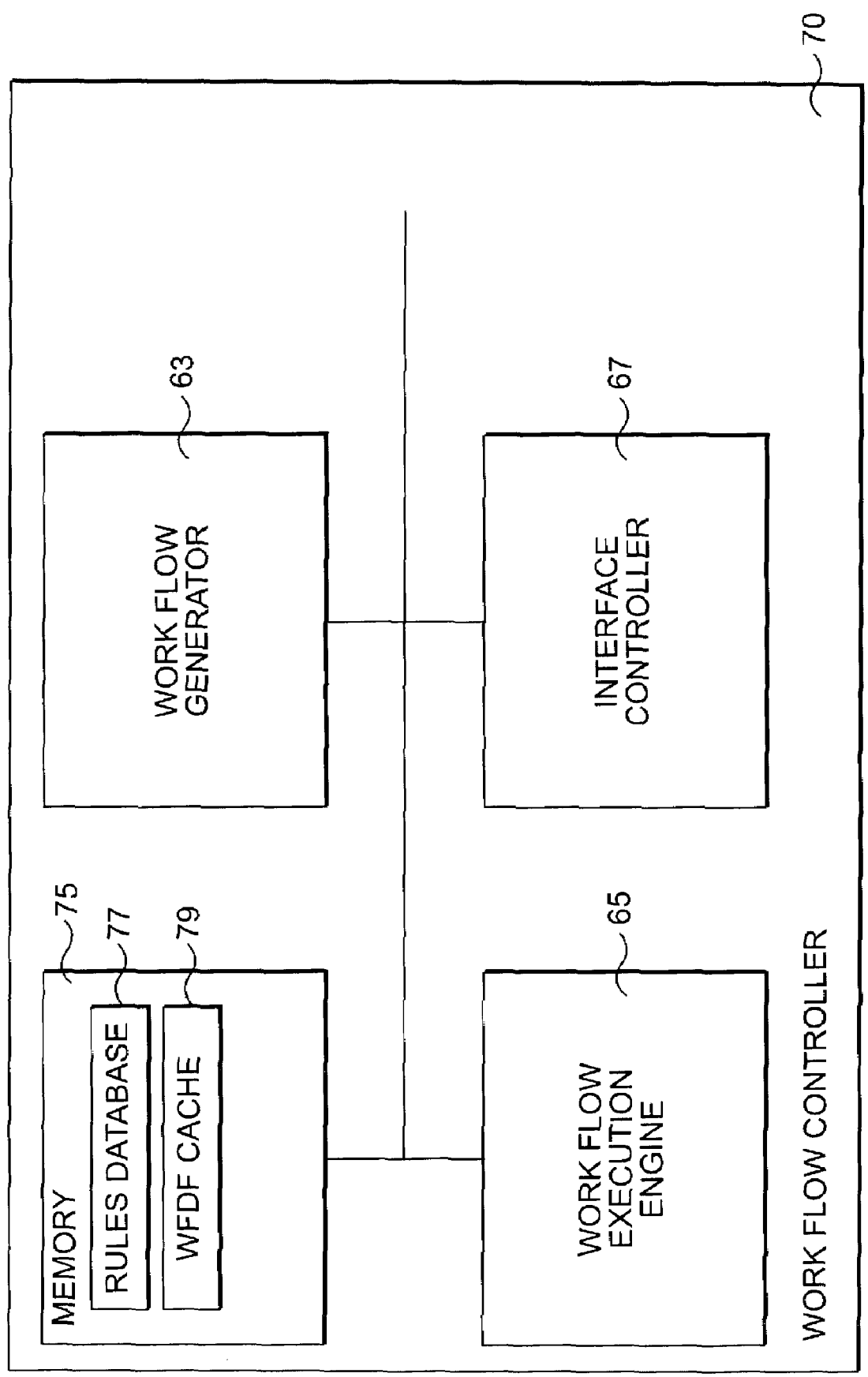
FIG. 8 is a block diagram of a workflow controller of FIG. 4.

The preceding discussion has stated that the workflow controller 70 may generate the workflow required to complete a specific job request 32, including generating (or retrieving) the workflow definition file $91_1$. FIG. 8 is a block diagram of the workflow controller 70 showing various components that allow for generation of the workflow, and management of workflow execution. The workflow controller 70 includes a memory 75. The memory 75 may include a rules database 77 and a short-term storage area, or workflow definition file cache 79. The rules database 77 includes rules for generating the workflow and the corresponding workflow definition file $91_i$. The cache 79 may be used for temporary storage of a workflow definition file $91_1$ during processing of a job request 32.

Also included in the workflow controller 70 are a workflow generator 63, a workflow execution engine 65, and an interface controller 67. The workflow generator 63 uses the information contained in the job request 32, and the rules in the rules database 77 to generate the workflow definition file $91_1$. The workflow execution engine 65 initiates and monitors execution of the tasks and sub-tasks defined in the workflow definition file $91_i$. The interface controller 67 provides a mechanism for communication between the client 31 and the service center 40 (See FIG. 3). The interface controller 67 may generate text messages, graphics, and other information that can be interpreted by a human user at the client 31. Alternatively, the interface controller provides communications capabilities directly between the client 31 and the service center 40.

The rules in the rules database 77 state propositions that may apply to a specific job request 32. Some rules may be recursive in nature. That is, a rule may continue to apply until a stated condition within the rule is met. Other rules in the rules database 77 may include mandatory, or prerequisite conditions to be completed before a task corresponding to the rule is executed. Furthermore, some rules may have prerequisites that prevent generation of a corresponding step until one or more prior tasks are completed. For example, and referring to the workflow shown in FIG. 2, a rule related to plate making may require specific resources, such as the content file 34, and completion of prior tasks, such a preflight 17.

In the print brochure example, the basic requirement (command) stated in the job request (PRINT_DOCUMENT) may invoke specific commands (and associated rules) that may be mandatory or optional for printing the brochure. PRINT_DOCUMENT may require PSP_SELECTED, which may require USER_SELECTION_PSP, which may require PSP_DISPLAY LIST, which may require PSP_QUERY, which may require PREFLIGHT_DOCUMENT. The rules associated with each of these commands may continue to apply until the requirements of the rule are satisfied. Thus, a rule that generates the command PSP_SELECTED may cause the workflow generator 63 to invoke the rule that generates PSP_SELECTED until either a user selects (USER_SELECTION_PSP) a print service, or until the workflow controller 70, in consulting the registry 60, selects a print service. In other words, when the workflow generator 63 receives the job request 32 to print the brochure, the workflow generator 63 consults the rules database 77 and determines that the first rule to satisfy is to preflight the document (i.e., to obtain the document print requirements). Once the document print requirements are available (the requirements may be supplied with the job request 32, or may be entered subsequent to submission of the job request 32, typically in reaction to a prompt, or other direction from the workflow controller 70 to the client 31 originating the job request 32), the process of consulting rules, and generating a workflow continues.

At some point in generation of the workflow (and generation of the workflow definition file $91_1$), the workflow controller 70, and its component parts, may have sufficiently defined the required tasks and selected the appropriate services $80_i$ such that execution of the workflow can commence. That is, in an embodiment, the workflow generator 63 may only generate a first portion of the workflow, and may subsequently add to the workflow as specific tasks are completed, as services $80_1$ become available, or for other reasons. Thus, a complete workflow definition is not required in order to begin the job stated in the job request 32. Following commencement of the workflow, the workflow generator 63 may continue to generate the workflow, and may define specific tasks and sub-tasks based on completion (output resources) of prior tasks and sub-tasks. Thus, for example, a task to bind a document may wait until the inside pages of the document are prepared, since the type of binding, and the binding service, may be optimized once the number of inside pages is known. This feedback function may be provided by the workflow execution engine 65 in communication with the workflow generator 63. The workflow execution engine 65 may include programming and algorithms that allow the workflow execution engine 65 to determine when conditions (e.g., output resources) for a specific task are met. Using this information, the workflow execution engine 65 may provide actual output resources information to the workflow generator 63 so that the workflow generator may dynamically alter, or continue to generate the workflow, and the corresponding the workflow definition file $91_i$.

FIG. 9 illustrates an example of application of print document rules as applied by the workflow generator 63. In the example shown, the client 31 sends a job request 32 to the service center 40 requesting that a document (brochure) be printed. The workflow generator 63 interprets the job request 32 as belong to a class of actions titled PRINT_DOCUMENT. The workflow generator 63 then retrieves one or more rules that may relate to document printing from the rules database 77. The rules may be ordered according to an expected sequence of their application. Accordingly, the first rule retrieves is PREFLIGHT_DOCUMENT 84. The rule PREFLIGHT_DOCUMENT 84 may have associated prerequisites, input resources, and output resources. In addition, the node to which the rule applies may be indicated. If there are no prerequisite rules to satisfy, the workflow generator 63 checks the actual input resources (provided, for example, with the content file 34) against required input resources to determine if the workflow generator 63 can generate the PREFLIGHT node. The output resources lists the expected resources (i.e., content file 34, control data 36) that should be available after all processing at the PREFLIGHT node is complete. PSP_QUERY 85 has as a prerequisite the PRINT_DOCUMENT order. That is, the PSP_QUERY 85 will not be invoked if the job request 32 does not request printing a document. The PSP_QUERY may apply to two nodes, INSIDE PAGES and COVER, because both nodes may require use of a print service provider (service $80_1$). Ultimately, the workflow generator 63 may retrieve N rules from the rules database 77. However, not all rules need be identified upon receipt of the job request 32. Instead, because of the dynamic nature of the workflow generation, additional rules may be consulted based on completion of tasks and sub-tasks at various nodes in the workflow. Also, as noted above, one or more of the retrieved rules may be recursive, meaning the rule will continue to be applied until actual output resources match the expected output resources.

Figure 10:
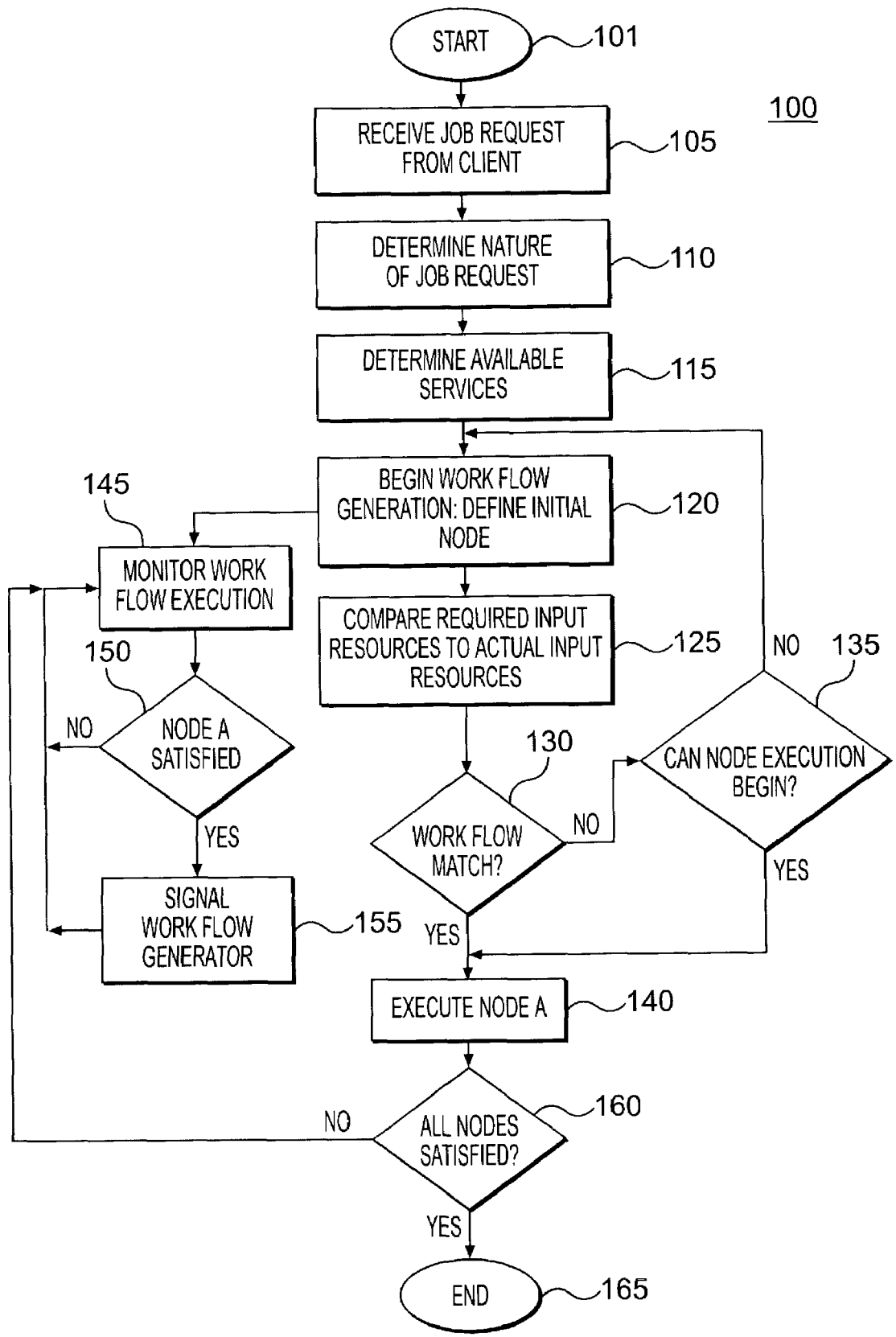
FIGS. 10-13 are flowcharts illustrating a method for dynamically generating a requirements-based workflow using the system of FIG. 3.

FIGS. 10-13 are flowcharts illustrating operations of the service center 40 to dynamically generate and execute a requirements-based workflow FIG. 10 illustrates an overall operation 100 for dynamically sequencing a requirements-based workflow. The example operation 100 is based on the node tree 10 of FIG. 2, and specifically on completing the inside pages nodes shown in FIG. 2. The operation 100 begins in start block 101. In block 105, the service center 40 receives a job request 32 from the client 31. In block 110, the workflow controller 70 determines the nature of the job stated in the job request 32, i.e., print a brochure, or more generally, print a document. In block 115, the workflow controller 70 determines which services $80_i$ are available for executing the various tasks and sub-tasks that may be required to print the brochure. In block 120, the workflow generator 63 begins the process of dynamically generating the work flow for printing the brochure by defining one or more initial nodes (referred to here for clarity as nodes A, B, C, . . . N) in the work flow, along with the tasks and sub-tasks needed to satisfy the node requirements for node A. In block 125, the workflow generator 63 compares the required node A input resources to the available resources. If the available resources match the required resources, the operation 100 moves to block 130, and the workflow generator 63 compares the generated workflow to an expected workflow to determine if the thus-generated workflow is at least initially completely defined. If the workflow is at least initially completely defined, the operation 100 moves to block 140.

If the workflow is not at least initially defined, the operation 100 moves to block 135, and the workflow execution engine 65 compares the available services $80_1$ and the requirements of the just-generated node, and determines if execution of the node may begin. If execution of the node may begin, the operation moves to block 140. In block 140, the workflow execution engine 65 directs the selected service(s) $80_1$ to execute node A. Following block 135, if the node resources are not satisfied, the operation 100 returns to block 120, and the process of dynamically generating the workflow continues.

In parallel with generating the work flow, the workflow execution engine 65 monitors, block 145, execution of the tasks and sub-tasks that define node A. In block 150, the workflow execution engine 65 compares the actual output resources of node A with the expected, or required, output resources of node A to determine when node A has been satisfied. When node A has been satisfied, the workflow execution engine 65 signals the workflow generator 63, block 155. The workflow generator 63 may use the results of the satisfied node A in the process of generating subsequent nodes (e.g., nodes B, C, . . . N), block 120. In block 160, the workflow execution engine 65 determines if all workflow nodes have been satisfied. If all nodes have been satisfied, the operation 100 moves to block 165 and ends. If all nodes have not been satisfied, the operation 100 returns to block 145, and the workflow execution engine 65 continues to monitor the execution.

Figure 11:
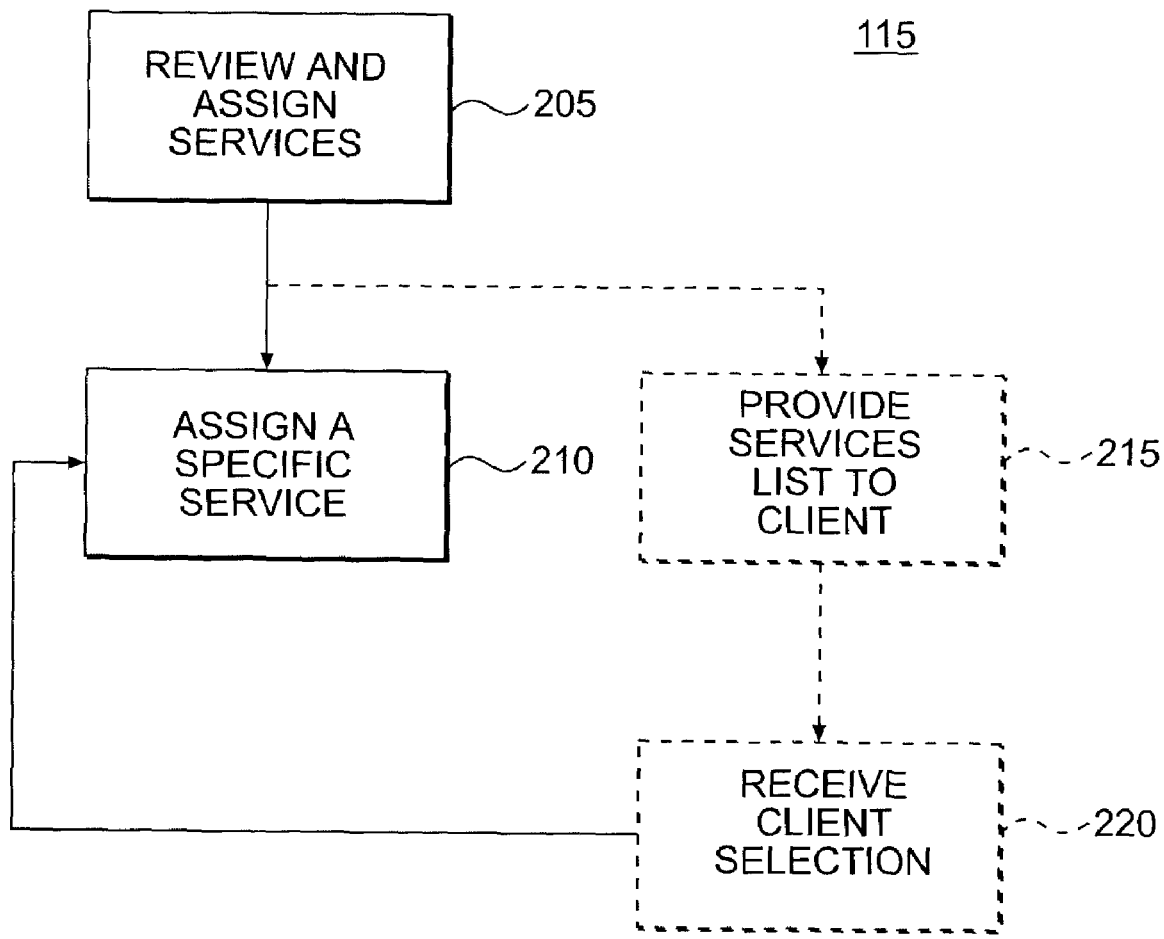

FIG. 11 illustrates an embodiment of the operation 115 to select one or more services $80_i$ to execute the tasks and sub-tasks expected to be required for printing the brochure. In review and assign services block 205, the workflow controller 70 determines which services $80_i$ are able and available to complete the job. In an embodiment, the workflow controller 70 makes this determination by consulting the registry 60. Alternatively, the optional bidding server 90 may use polling or bidding features to make the determination. If more than one service $80_1$ is available, and can satisfy the requirements of the job request 32, the workflow controller 70 may assign one specific service 80 to the job, block 210. Alternatively, the workflow controller 70 may provide a list of services $80_i$ to the client 31 (block 215), and allow the client 31 to select one or more services $80_i$ (block 220). The operation 115 then ends, and processing returns to the operation 100.

Figure 12:
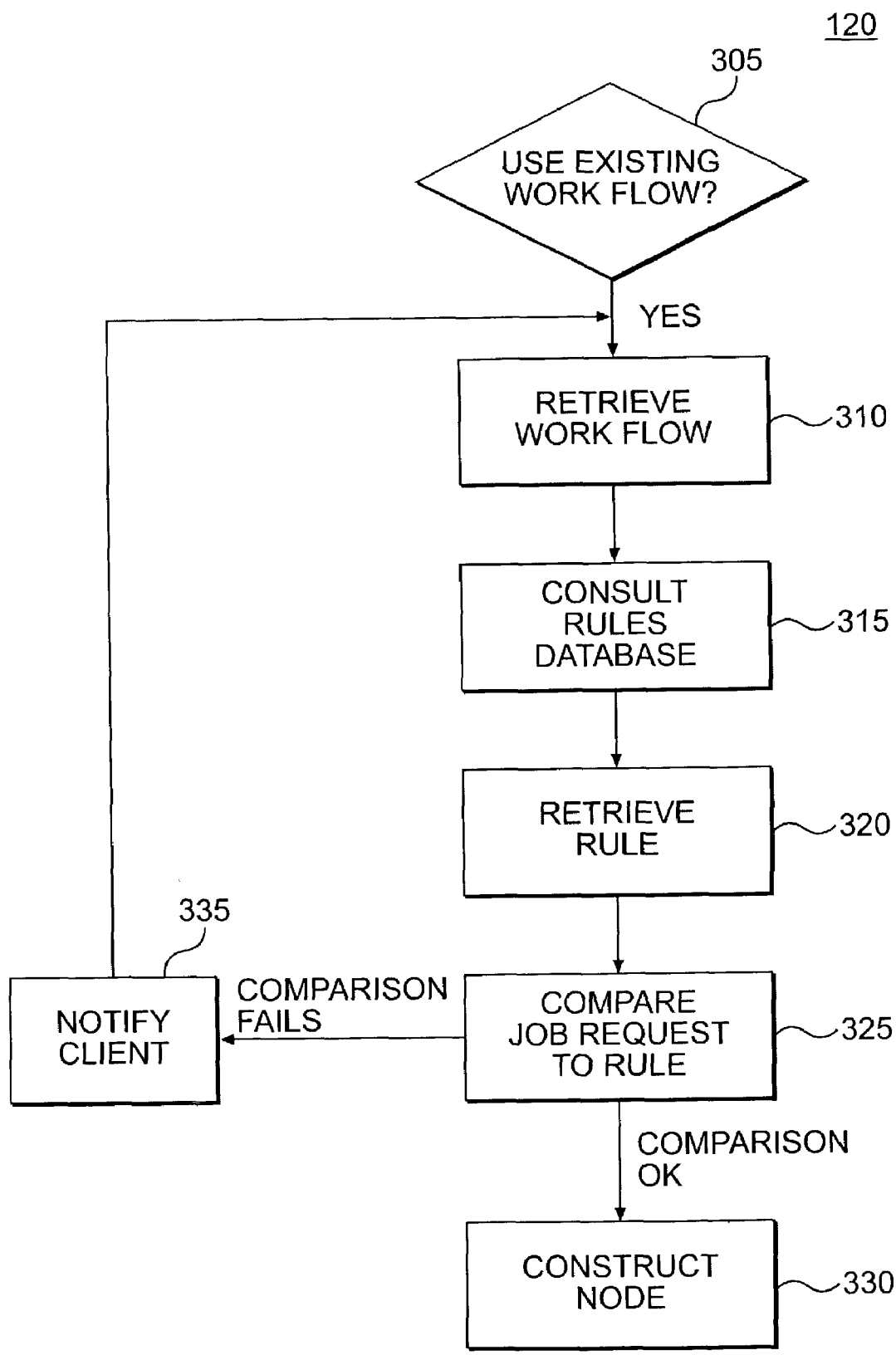

FIG. 12 illustrates an embodiment of the operation 120 for dynamically generating a workflow. As described above, the job request 32 may specify performance requirements, resources, and other parameters (i.e., the control data file 36), and may include the content file 34, or a link to the content file 36. The control data file 36 may identify that the job stated in the job request 32 is to be completed according to a previously defined workflow, which may be stored in the database 90. Alternatively, the job stated in the job request 32 may require generation of a new workflow. Even if the control data file 36 indicates use of an existing workflow, the workflow controller 70 may dynamically alter the workflow based on new services $80_i$, or for other reasons. In block 305, following determination of the nature of the job stated in the job request 32, the workflow controller 70 determines if the requested job includes use of an existing workflow. If an existing workflow is to be used, the workflow generator retrieves (block 310) the requested workflow from the database 90. If a new workflow is to be generated, the operation 120 moves to block 315. In block 315, the workflow generator 63 consults the rules database 77, and determines that for a print document job request, the first rule to apply is PREFLIGHT (node 17 of FIG. 2, and also, in this example, node A). In block 320, the workflow generator 63 retrieves the PREFLIGHT rule from the rules database 77. In block 325, the workflow generator 63 compares the content file 34 and the control data file 36 of the job request 32 to the input resource requirements specified in the PREFLIGHT rule. If the job request 32 meets the PREFLIGHT rule input resource requirements, the operation 100 proceeds to step 330 and the workflow generator constructs a PREFLIGHT node (node A) for a workflow definition file $91_1$. If the comparison of block 325 fails, the operation moves to step 335, and the workflow controller 70, using the interface 67, notifies the client 31 that additional information or input resources are needed. Such notification may include a pop-up window display, a text message, or a procedure call to the client 31, for example. The operation 120 then returns to block 310 and the service center 40 waits on receipt of a modified job request. The operation 120 may optionally include a time-out feature that ends the operation 120 (and the operation 100) should the client 31 not respond to the notification of block 335 within a specified time.

Figure 13:
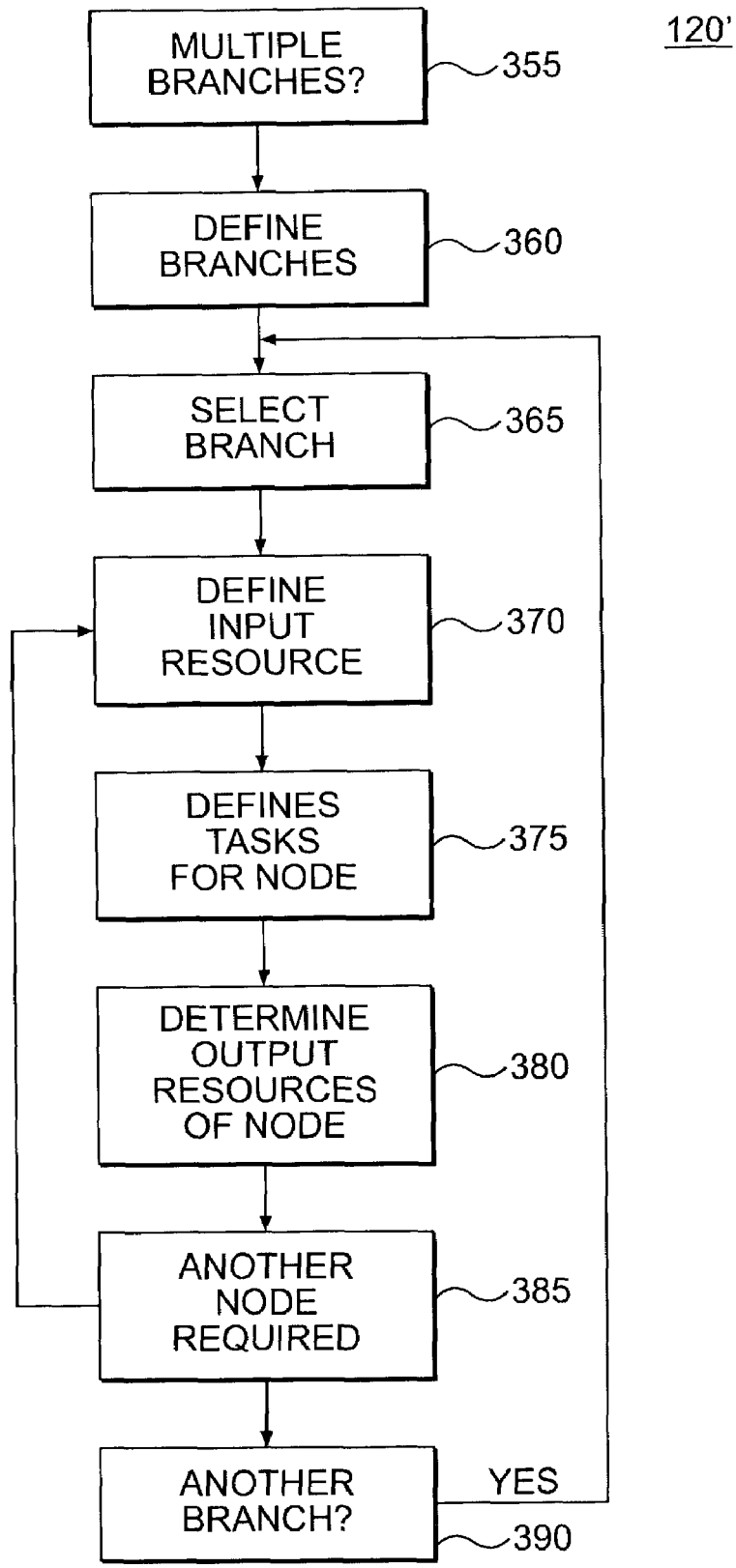

FIG. 13 illustrates an alternative operation 120' for dynamically generating and sequencing defining a workflow. In block 355, the workflow controller 70 determines if the workflow will contain multiple branches. If the workflow will contain multiple branches, the workflow controller 70 defines the branches, block 360. In block 365, the workflow controller 70 selects a branch for which resources and services $80_1$ are to be defined. In block 370, the workflow controller 70 defines input resources for a first node. In block 375, the workflow controller 70 defines the tasks to be completed for the first node. In block 380, the workflow controller 70 determines the output resources of the first node. In block 385, the workflow controller 70 determines if another node is required for the workflow or branch. In no additional nodes are required, the workflow controller 70 determines if another branch is to be defined, block 390. If another branch is to be defined, the workflow controller 70 selects another branch, block 365, and the operation 120' continues. If another branch is not to be defined, the operation 120' ends, and processing returns to the operation 100.

The methods illustrated in FIGS. 10-13 may be executed by a suitably programmed general purpose computer, a special purpose computer, and an application specific integrated circuit, for example. The programming may be written on a computer readable medium, including a magnetic storage medium and an optical storage medium, for example.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. A system for dynamic sequencing of a requirements-based workflow, comprising:
   a registry that stores information related to services available to complete a received job request; and
   a workflow controller capable of dynamically generating a workflow based on the received job request, the workflow controller comprising a rules database containing rules that specify requirements for constructing the workflow based on a nature of the job request, the workflow including one or more nodes, wherein the workflow controller dynamically generates the workflow by recursively applying one or more of the rules from the rules database and comparing the requirements of the rules to outputs of prior nodes to generate subsequent nodes, and wherein the services execute the nodes.

2. The system of claim 1, further comprising a service center in a distributed network, the service center operable to couple one or more clients, the services, and the workflow controller, wherein the one or more clients originate job requests.

3. The system of claim 1, wherein the workflow controller further comprises a workflow execution engine that monitors execution of nodes in the workflow, wherein the workflow execution engine indicates when a node is complete.

4. The system of claim 1, wherein the registry includes the information related to the services by type of service.

5. The system of claim 1, wherein the workflow controller comprises means for determining which service of the available services is assigned to execute a node in the workflow.

6. The system of claim 5, wherein the determining means comprises a ranking algorithm that determines an optimum service to execute the node.

7. The system of claim 6, wherein the ranking algorithm is based on client-supplied criteria.

8. A method for dynamic sequencing of a requirements-based workflow, comprising:
   receiving a job request, the job request specifying a job to be completed;
   generating a dynamic workflow sequence based on the job, wherein generating the dynamic workflow sequence, comprises:
      defining a first node in the workflow sequence by consulting a rules database to determine application of at least a first rule, wherein the at least first rule is determined based on the nature of the job and recursively applying the at least first rule to define the first node, and
      determining input resources and expected output resources for the first node;
   determining when the first node may execute, wherein execution of the first node begins; and
   determining if additional nodes are required to satisfy the job based on actual output resources of the first node.

9. The method of claim 8, further comprising:
   consulting the rules database to determine application of one or more subsequent rules; and
   recursively applying each of the one or more subsequent rules to further define the first node.

10. The method of claim 8, further comprising;
    consulting a registry of available services to execute the first and the additional nodes; and
    selecting one or more of the available services to execute each of the first and the additional nodes.

11. The method of claim 10, wherein the selecting step for one node is completed based on outputs of a prior completed node.

12. The method of claim 8, wherein generating the dynamic workflow sequence comprises generating one or more workflow branches, wherein a workflow branch may include a plurality of nodes, and wherein two or more branches may execute in parallel.

13. The method of claim 8, wherein executing the first node may begin before generation of any of the additional nodes.

14. The method of claim 8, wherein the determined input resources are not sufficient to define the first node, and further comprising notifying a client originating the job request to prompt submission of sufficient input resources.

15. The method of claim 8, further comprising:
    defining the workflow in a workflow definition file; and
    sharing the workflow definition file among parallel executing services.

16. A system to dynamically sequence workflows in a distributed network, comprising:
    means for receiving a job request at a service center in the network, the job request including information related to a job;
    means for dynamically generating a workflow based on the received job request by recursively applying one or more rules based on the received job request to define one or more nodes within the workflow;

means for coupling services to the dynamic generating means; and means for storing information related to the services, wherein the dynamic generating means uses the stored information related to the services and the information related to the job to generate the workflow.

17. The system of claim 16, wherein the dynamic generating means comprises:

a workflow generator that generates the one or more nodes in the workflow; and a rules database that includes the one or more rules related to generating the nodes, wherein the workflow generator uses one or more rules to generate the nodes.

18. The system of claim 16, wherein the dynamic generating means comprises means for selecting one or more of the services for execution of a node, and wherein the selecting means comprises means for ranking the services based on client-defined criteria.

19. A computer readable medium comprising programming to execute a method for dynamic sequencing of a requirements-based workflow, the method comprising:

receiving a job request, the job request specifying a job to be completed;

generating a dynamic workflow sequence based on the job, wherein generating the dynamic workflow sequence, comprises:

defining a first node in the workflow sequence including consulting a rules database to determine application of at least a first rule, wherein the at least first rule is determined based on the nature of the job and recursively applying the at least first rule to define the first node, and determining input resources and expected output resources for the first node;

determining when the first node may execute, wherein execution of the first node begins; and determining if additional nodes are required to satisfy the job based on actual output resources of the first node.

20. The computer readable medium of claim 19, wherein the method further comprises:

consulting the rules database to determine application of one or more subsequent rules; and recursively applying each of the one or more subsequent rules to further define the first node.

21. The computer readable medium of claim 19, wherein the method further comprises;

consulting a registry of available services to execute the first and the additional nodes; and selecting one or more of the available services to execute each of the first and the additional nodes.

22. The computer readable medium of claim 21, wherein the selecting step for one node is completed based on outputs of a prior completed node.

23. The computer readable medium of claim 19, wherein generating the dynamic workflow sequence comprises generating one or more workflow branches, wherein a workflow branch may include a plurality of nodes, and wherein two or more branches may execute in parallel.

24. The computer readable medium of claim 19, wherein executing the first node may begin before generation of any of the additional nodes.

25. The computer readable medium of claim 19, wherein the determined input resources are not sufficient to define the first node, and further comprising notifying a client originating the job request to prompt submission of sufficient input resources.

26. The computer readable medium of claim 19, wherein the method further comprises:

defining the workflow in a workflow definition file; and sharing the workflow definition file among parallel executing services.

27. A computer programmed to execute a method for dynamic sequencing of a requirements-based workflow, the method comprising:

receiving a job request, the job request specifying a job to be completed;

generating a dynamic workflow sequence based on the job, wherein generating the dynamic workflow sequence, comprises:

defining one or more nodes in the workflow sequence by consulting a set of rules to determine application of one or more rules, wherein the one or more rules are determined based on the nature of the job, and recursively applying the one or more rules to define the one or more nodes, and determining input resources and expected output resources for the first node;

determining when the first node may execute, wherein execution of the first node begins; and determining if additional nodes are required to satisfy the job based on actual output resources of the first node.

* * * * *

UNITED STATES PATENT AND TRADEMARK OFFICE
CERTIFICATE OF CORRECTION

PATENT NO. : 7,299,244 B2
APPLICATION NO. : 10/315106
DATED : November 20, 2007
INVENTOR(S) : William Hertling et al.

It is certified that error appears in the above-identified patent and that said Letters Patent is hereby corrected as shown below:

In column 5, line 42, after "service" insert -- 30 --.

Signed and Sealed this

Thirteenth Day of May, 2008

JON W. DUDAS
*Director of the United States Patent and Trademark Office*